May 10, 1966  R. R. HELLMAN  3,250,872
PRESSURE SWITCH WITH TEMPERATURE SETTING OF BASE PRESSURES
Filed Oct. 7, 1963

INVENTOR.
Robert R. Hellman
BY
Johnson and Kline
ATTORNEYS

United States Patent Office 3,250,872
Patented May 10, 1966

3,250,872
PRESSURE SWITCH WITH TEMPERATURE SETTING OF BASE PRESSURES
Robert R. Hellman, Bridgeport, Conn., assignor to Westport Development & Manufacturing Company, Inc., Milford, Conn., a corporation of Connecticut
Filed Oct. 7, 1963, Ser. No. 314,478
12 Claims. (Cl. 200—83)

The present invention relates to a pressure responsive device that senses a preselected value of pressure of an external fluid under a variable pressure and more particularly to having the preselected value of pressure that is sensed be a value of differential pressure existing between another contained fluid maintained at a constant pressure in the device and the value of the pressure of the external fluid.

In the design of pressure responsive devices, a compromise is generally made between the factor of sensitivity of the device and the factor of the value of the pressure of the fluid that is to be sensed. Thus for example, it has heretofore been difficult to sense, with an accuracy of plus or minus a pound, pressure of several hundreds of pounds while on the other hand pressures of a few pounds may be sensed within small percentages thereof and hence quite accurately. In order to achieve sensitivity while operating at high fluid pressures, there have been proposed differential pressure devices in which the pressure sensing element is responsive to the difference in pressure between a contained fluid under a known value of pressure and the external fluid having a variable pressure which is to be sensed. For example, while the value of the variable pressure may be on the order of eight hundred pounds, a differential pressure on the order of five or so pounds may be achieved if the contained fluid is maintained at a constant pressure which is slightly more or less than eight hundred pounds and thus sensitivity of the device and yet high pressure sensing may both be achieved. However, in devices heretofore proposed it has been difficult to maintain the maintained fluid under a constant value of the pressure and hence the accuracy of the pressure device is accordingly changed, if the constant pressure deviates from that value to which it has been set. Moreover, it has been found difficult in the manufacture of such devices to produce this set value of constant pressure with accuracy and have it be maintained constant under wide ranges of environmental conditions.

It is accordingly an object of the present invention to provide a pressure sensing device that is capable of sensing relatively high values of pressures of a variable pressure external fluid but yet maintains extreme sensitivity and accuracy at said high values of pressure.

Another object of the present invention is to provide a differential pressure sensing device in which the pressure of the contained fluid is finally adjusted and maintained at a substantially constant value of pressure by regulating the temperature of the container holding the fluid and hence the temperature of the contained fluid.

A further object of the present invention is to provide a differential pressure responsive electrical switch that achieves the above objects and yet is extremely durable in use, reliable in operation and capable of withstanding abnormal environmental conditions without permanent disablement.

In carrying out the present invention there is provided a pressure sensing device consisting specifically of a bellows whose length is accurately responsive to the difference in pressure existing between a fluid exerting a pressure on its exterior surface and a fluid exerted a pressure on its interior surface. Thus the length of the bellows changes with the difference in value of the pressures existing between its interior and exterior surfaces. In the disclosed embodiment herein described the bellows is mounted within a housing into which the variable pressure exterior fluid is introduced to exert a pressure on the exterior of the bellows. The interior of the bellows has an absolute (not atmospheric) pressure exerted thereon by a fluid that is contained within a closed container, the housing and the container being uncommunicating while the interior of the bellows communicates with the closed container such that the fluid pressure within the bellows is the same as in the closed container.

The contained fluid is set and maintained very accurately at a constant pressure by it being within the closed container so that its volume remains unchanged. However, according to the present invention, in order to accurately adjust and maintain the pressure of the fluid, adjustment is made of the temperature of the fluid. Thus by finally adjusting the pressure of the fluid by adjusting its temperature and then by maintaining the temperature of the fluid within a substantially small temperature range about the adjusted temperature, the pressure of the contained fluid is thus accurately maintained within an exceedingly small pressure range, well below the sensitivity of the device. For maintaining the temperature of the fluid substantially constant there is provided a heat sink of substantial mass that circumscribes the closed container and the heat sink is circumscribed by a heating element which with thermostatic controls provides for maintaining the temperature of the heat sink within the desired temperature range and accordingly the temperature of the contained fluid.

Other features and advantages will hereinafter appear.

Figure 1:
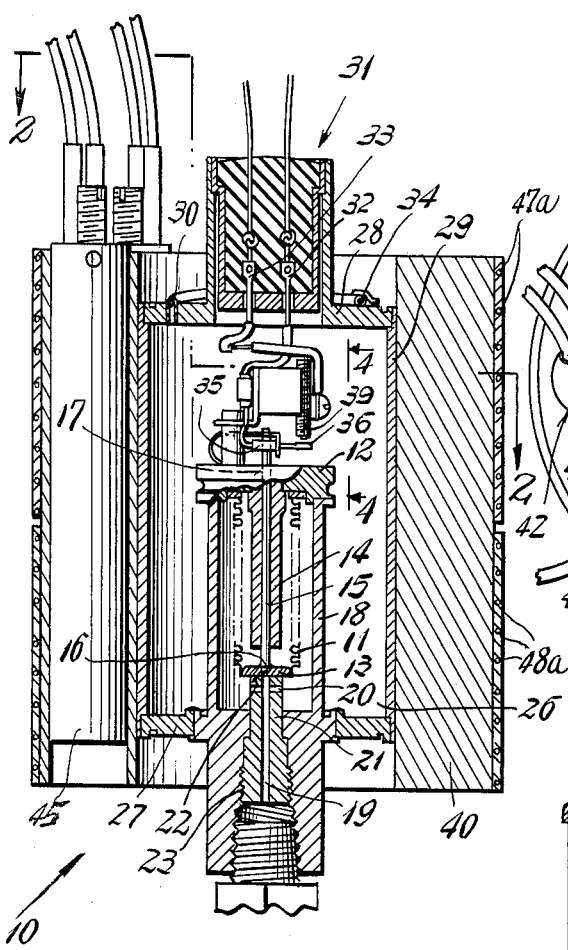
FIGURE 1 is an elevation, substantially in section, of the differential pressure sensing switch of the present invention.
Figure 2:
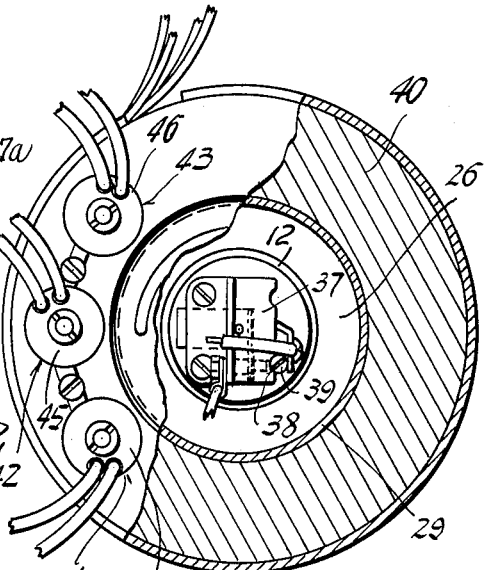
FIG. 2 is a plan view, partly in section, taken on the line 2—2 of FIG. 1.

Referring to the drawing, the differential pressure sensing switch of the present invention is generally indicated by the reference numeral 10 and has an elongate bellows 11 closed at its lower end by an end plug 12 and having a base 13 positioned at its upper end. The bellows is essentially a piece of cylindrical tubing with annular corrugations formed in its wall and hence is capable of having its length, between the end plug 12 and its base 13 varied in the specific embodiment of the invention shown though it will be understood that the term bellows as used herein includes diaphragm or membrane and piston types in which a physical change thereof is related to the values of a differential pressure. The plug 12 is in fluid sealing relationship with the bellows 11 while the base 13 includes an elongate annular guide 14 that extends within the interior of the bellows. Mounted within the guide 14 is a rod 15 having a lower end 16 secured as by welding or otherwise engaging to be movable with the plug 12. The rod 15 extends outwardly through an aperture 17 formed in the base 13 and the base 13 is fluid sealingly connected to the bellows except for a communication to the interior of the bellows, by a passageway that exists between the rod 15, the guide 14 and the aperture 17.

Figure 3:
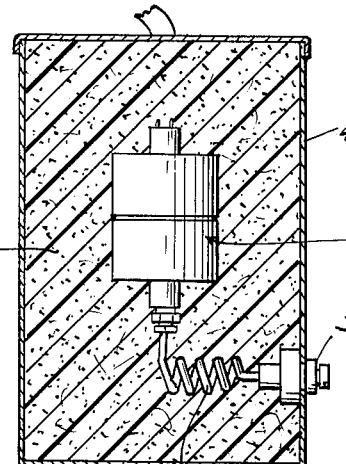
FIG. 3 is an elevation, partly in section, of the differential pressure sensing switch of the present invention, as it appears for use.
Figure 4:
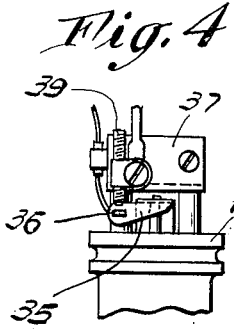
FIG. 4 is a detail looking in the direction of the arrow 4—4 of FIG. 1, of the electrical switch mechanism.

The exterior of the bellows is surrounded by a housing 18 which is secured at its upper end to the base 13 in fluid sealing relationship. At its lower end there is formed an opening 19 that terminates in cross passageways 20 to enable fluid communication between the interior of the housing 18 and the aperture 19. In addition, the housing 18 includes an abutment member 21 having a flat surface 22 which is aligned with the end plug 12 and constitutes a stop, limiting the downward or elongating movement of the bellows. Preferably the abutment member 21 is formed as an integral member which is screw threaded as at 23 into an aperture formed in the housing 18 and thus not only provides for permitting adjustment of the position of the surface but also facilitates the forming of openings 19 and 20 therein. With this construction it will be appreciated that the exterior of the bellows is accordingly subjected to the pressure of a fluid in the passageways 20 and in the specific embodiment of the invention such a fluid is the exterior fluid whose variable value of pressure is to be sensed. As shown in FIG. 3, for providing a connection to the passageways 20 there is a tube 25 that enables connection of the passageways to a source of the exterior fluid.

The housing 18 is located within a substantially cylindrical, closed container 26 having a lower end wall 27, an upper end wall 28 and a cylindrical side wall 29. The end wall 27 is formed to receive the abutment member 21 to enable the passageways 20 to communicate through the lower end wall 22 with the interior of the housing 18. The upper end wall 28 has extending therethrough a tube 30 for communication with the interior of the container and an electrical fitting 31 through which lead wires 32 and 33 enter into the container. The container is fluid tight and in accordance with the present invention is preferably filled with an inert gas such as a combination of helium and nitrogen that is introduced through the tube 30 and after a desired pressure has been achieved in the container, as will be hereinafter appreciated, the tube 30 is closed as by welding its passageway as at 34.

It will be appreciated that with the above construction that the length of the bellows is responsive to the differential pressure existing between the pressure of the contained fluid in the container 26 and the pressure of the exterior fluid within the housing 18 and as this differential pressure changes, the length of the bellows changes and accordingly the rod 15 will move longitudinally. The existence of a predetermined differential pressure effects an electrical signal in the leads 32 and 33 by the lead wire 32 being connected to a clip 35 fastened on the end portion of the rod 15 with the clip carrying an electrical contact 36. In addition, mounted on the end plug 12 is a post 37 in which is formed a threaded open aperture 38 that has a threaded contact 39 mounted therein to be in alignment with the contact 36. The lead 33 is electrically connected to the threaded contact 39. Accordingly when the rod has achieved the position when the two contacts 36 and 39 are in engagement, then a circuit through the leads 32 and 33 is closed and is utilized to provide an electrical indication of the existence of the preselected differential pressure. Moreover, by the use of the threaded aperture 38 and threaded contact 39, the preselected pressure may be adjusted.

In carrying out the present invention, in order to be able to detect differential pressure, which for example may be on the order of a half a pound per square inch when the pressure of the exterior fluid may be on the order of 800 pounds per square inch, the gas within the container 26 is maintained accurately at a set temperature with a consequent precise maintenance of the pressure of the fluid within the container. This is achieved by mounting the container 26 within a thick annular ring 40 such that the side wall 29 of the container is in heat exchanging relationship with the interior surface of the ring. The ring is provided with apertures 41, 42 and 43 into which are positioned thermostats 44, 45 and 46 respectively which sense the temperature of the ring and by controlling heating of the ring maintains the ring at a set temperature. The ring is provided with two heating means, an upper heating means 47 and a lower heating means 48, with each of the heating means in the specific embodiment of the invention herein described being a flexible flat sheet of silicone rubber with heating elements 47a and 48a respectively embedded therein and both heating means are wrapped about the periphery of the ring to substantially enclose it.

Figure 5:
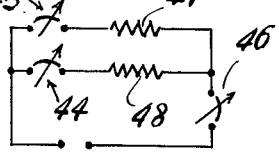
FIG. 5 is an electrical schematic diagram of the electrical heating components utilized in the present invention.

As shown in FIG. 5, the electrical schematic diagram of the heating circuit, the upper heating means 47 is controlled by the thermostat 45 while the lower heating means is controlled by the thermostat 44. In addition the thermostat 46 by being connected in series with both heating means is capable of ceasing energization of the heating means.

More particularly, the thermostat 45 which controls the energization of the upper heating means is normally closed but set to open at a temperature of the ring that provides the known temperature of the gas and hence its pressure within the container 26. The thermostate 44 is also normally closed but set to open at a slightly lower temperature than the thermostate 45. The thermostate 46 is also normally closed but set to open at a slightly higher temperature than the thermostate 45. Accordingly for temperatures of the ring below that to which the thermostat 45 is set to open, both heating means 47 and 48 will be energized, while when the temperature is higher than that of thermostat 44, thermostat 45 will still be closed to provide heating only by the upper heating means, the thermostat 45 becoming open, ceasing heating by the lower heating means. However, in the event that the temperature of the ring exceeds the temperature at which thermostate 46 is set to open as may occur during a malfunctioning of either or both of the other thermostats 44 and 45, then it will open, deenergizing both heating means. Preferably the temperatures at which the three thermostats open are higher than the environmental temperature where the switch is employed. One example of the temperatures at which the thermostats may function are thermostat 45, 200 degrees F., thermostat 44, 195 degrees F. and thermostat 46, 205 degrees F. It is additionally understood that the thermostats are adjustable in that the temperature at which they are set to function may be altered.

As shown in FIG. 3, when the differential pressure switch of the invention is in use, it is preferred that it be mounted within a can 49 that is filled with molded foam silicone rubber 50 in order to provide heat insulation for the ring and also a mounting for the differential pressure switch which enables it to withstand substantial conditions of shock. The tube 25 may also terminate in an aperture 51 formed in the side of the can 49 to which a fluid conduit may be connected to provide the exterior pressure of the fluid on the bellows in the housing 18.

It has been found desirable to construct the heat sink and container from metal having good heat conductivity, such as aluminum, so that the temperatures throughout will be substantially the same.

In constructing the switch of the present invention, the bellows and contacts 36 and 39 are accurately set to sense a selected value of differential pressure between its interior and exterior as by adjustment of the contact 39. Then the housing and bellows are assembled within the can 49 and a known pressure is introduced into the passageway 19. In addition, an inert gas mixture is introduced into the container 26 through the passageway 30 and the pressure of the inert gas is increased until there is a change in the condition of the contact members, as by their closing, at which time the pressure in the container is decreased slightly and tube 30 sealed. During this operation the temperature of the heat ring and hence the fluid within the container is maintained lower than that finally desired and in order to accurately set the pressure of the inert gas in the container, the temperatures of the thermostats are increased until the switch contacts 36 and 39 close at which time the known pressure within the container 26 is thus the known pressure introduced through the passageway 19 plus or minus the differential of the bellows that had heretofore been determined. It will be appreciated that with this construction that the temperature at which the thermostats 44, 45 and 46 will operate is not known and in fact so long as these temperatures are higher than those which the differential pressure switch will normally encounter in use, it is immaterial provided of course that the heating means is capable of maintaining this temperature. Thus the present invention provides for accurately maintaining the known pressure within the container 26 by the regulation of the temperature of the inert gas within the container. Thus while there may be a few tenths of a degree range of change in the temperature of the ring such a change will have only an extremely slight change on the pressure which is only a small percentage of the sensitivity at which the switch is required to operate.

While the above-described operation sets forth the increasing of the temperature to finally adjust the pressure of the inert gas in the container, it will be appreciated that, if desired, the pressure of the inert gas may be adjusted by having its pressure and temperature higher than desired and then decreasing the temperature of the gas after the tube 30 has been sealed.

It has been found that with a mixture of approximately 1 part helium to 20 parts nitrogen, that one degree change in temperature produces a one pound change in pressure. Naturally other gases may be selected in which the ratio of the change in temperature to pressure may be different. Thus for the same sensitivity of the thermostats 44, 45 and 46, as for example $\pm 1/10°$ C., the range of pressure of the contained gas fluid may be easily adjusted simply by changing the kind of fluid that is contained.

It will accordingly be appreciated that there has been disclosed a differential pressure switch which is capable of sensing the pressure of an unknown fluid by measuring the difference in pressure between the unknown fluid and the known pressure of a contained fluid. The known pressure of the contained fluid, according to the present invention, is maintained accurately at a set valve by regulating the temperature thereof by the use of thermostats which control the heating applied to a heat sink which is in heat exchanging relationship with the gas container and hence the gas itself. By such a construction, a low pressure switch with inherent sensitivity is utilized to indicate high pressures on the order of hundreds of pounds while maintaining the same inherent sensitivity at these high pressures that it had at the low pressures and thus the range of sensitivity in pounds in the same at the high pressures as at the low pressures.

Variations and modifications may be made within the scope of the claims and portions of the improvements may be used without others.

I claim:

1. A differential pressure switch comprising a closed container having a substantially constant volume, a contained fluid under pressure in said container and adapted to have its pressure varied with changes in its temperature, means for maintaining said fluid at a substantially constant temperature for desired lengths of time, an elongatable bellows mounted within said container and having its length varied with a differential pressure applied thereto, means for applying the differential pressure existing between the contained fluid and an external fluid to said bellows, and switch means actuated by changes in length of said bellows whereby differences in pressure between the contained fluid and the external fluid produce changes in length of said bellows with consequent actuation of said switch means.

2. A differential pressure switch comprising a closed container having a substantially constant volume, a contained fluid under pressure in said container and adapted to have its pressure varied with changes in its temperature, means for maintaining said fluid at a substantially constant temperature for desired lengths of time, an elongatable bellows mounted within said container and having a free end, means for applying the differential pressure existing between the contained fluid and an external fluid to said bellows, a rod engaging said free end of said bellows and extending out of the other end, and switch means mounted in said container and having one contact responsive to movement of said rod and a stationary contact whereby differences in pressure between the contained fluid and the external fluid produce changes in length of said bellows with consequent actuation of said switch means.

3. A differential pressure switch comprising a closed container having a substantially constant volume, a fluid under pressure in said container and adapted to have its pressure varied with changes in its temperature, means for maintaining said fluid at a substantially constant temperature, said means including a heat sink mounted in heat exchanging relationship with said container, heating means for heating said heat sink upon energization, means for sensing the temperature of the heat sink to effect energization of said heating means, an elongatable bellows mounted within said container and having its length varied with a differential pressure applied thereto, means for applying the differential pressure existing between the contained fluid and an external fluid to said bellows, and switch means actuated by changes in length of said bellows whereby differences in pressure between the contained fluid and the external fluid produce changes in length of said bellows with consequent actuation of said switch means.

4. The invention as defined in claim 3 in which the means for sensing the temperature of the heat sink includes at least one thermostat having an adjustment for changing the temperature at which it is actuated.

5. The invention as defined in claim 3 in which the heat sink is annular and elongate, the container has a cylindrical periphery and the container is positioned within said heat sink with its periphery in heat exchanging relationship therewith, said heat sink having a substantially larger mass than said container.

6. The invention as defined in claim 5 in which there is provided a can, the heat sink is positioned within the can and means providing heat insulation and shock mounting fills the remaining space in said can.

7. A differential pressure switch comprising a closed container having a substantially constant volume, a contained fluid under pressure in said container and adapted to have its pressure varied with changes in its temperature, means for maintaining said fluid at a substantially constant temperature, an elongate bellows mounted within said container and having a free end, means for communicating the interior of the bellows with the contained fluid, a bellows housing enclosing the exterior of the bellows to seal said exterior of the bellows from the contained fluid, an entrance to said housing by which an external fluid may be introduced therein, a rod engaging said free end of said bellows and extending out of the other end, and switch means mounted in said container and having one contact responsive to movement of said rod and a stationary contact whereby differences in pressure between the internal fluid and the contained fluid produce changes in length of said bellows with consequent actuation of said switch means.

8. A differential pressure switch comprising a closed container having a substantially constant volume, a contained fluid under pressure in said container and adapted to have its pressure varied with changes in its temperature, means for maintaining said fluid at a substantially constant temperature, an elongatable bellows mounted within said container and having a free end, means for communicating the interior of the bellows with the contained fluid, a bellows housing enclosing the exterior of the bellows to seal said exterior of the bellows from the contained fluid, an entrance to said housing by which an external fluid may be introduced therein, a rod engaging said free end of said bellows and extending out of the other end, and switch means mounted in said container and having one contact responsive to movement of said rod and a stationary contact, means for adjusting the position of the stationary contact with respect to the one contact whereby differences in pressure between the contained fluid and the external fluid produce changes in length of said bellows with consequent actuation of said switch means.

9. A differential pressure switch comprising a closed container having a substantially constant volume, a contained fluid under pressure in said container and adapted to have its pressure varied with changes in its temperature, means for maintaining said fluid at a substantially constant temperature, said means including a heat sink mounted in heat exchanging relationship with said container, heating means for heating said heat sink upon energization, means for sensing the temperature of the heat sink to effect energization of said heating means, an elongatable bellows mounted within said container and having a free end, means for communicating the interior of the bellows with the contained fluid, a bellows housing enclosing the exterior of the bellows to seal said exterior of the bellows from contained fluid, an entrance to said housing by which an external fluid may be introduced therein, a rod engaging said free end of said bellows and extending out of the other end, and switch means mounted in said container and having one contact responsive to movement of said rod and a stationary contact whereby differences in pressure between the contained fluid and the external fluid produce changes in length of said bellows with consequent actuation of said switch means.

10. The invention as defined in claim 9 in which the heating means includes a first electric heating element and a second electric heating element and the means for effecting energization includes a first thermostat connected to control the first heating element, a second thermostat connected to control the second heating element and a third thermostat connected to effect deenergization of both heating elements.

11. The invention as defined in claim 10 in which the first thermostat effects deenergization of the first heating means at a temperature slightly lower than the second thermostat effects deenergization of the second heating element and the third thermostat effects deenergization of both heating elements at a temperature slightly higher than the temperature at which the second thermostat effects deenergization of the second heating element.

12. A differential pressure device comprising a closed container having a substantially constant volume, a contained fluid under pressure in said container and adapted to have its pressure varied with changes in its temperature, means for maintaining said fluid at a substantially constant temperature, an elongatable bellows mounted within said container and having a free end, means for communicating the interior of the bellows with the contained fluid, a bellows housing enclosing the exterior of the bellows to seal said exterior of the bellows from the contained fluid, an entrance to said housing by which an external fluid may be introduced therein, a rod engaging said free end of said bellows and extending out of the other end, switch means mounted in said container and having one contact responsive to movement of said rod and a stationary contact whereby differences in pressure between the contained fluid and the external fluid produce changes in length of said bellows with consequent actuation of said switch means, and a can filled with shock absorbing and heating insulating material enclosing said device, said can having a fluid conduit communicating with said entrance.

References Cited by the Examiner
UNITED STATES PATENTS

| | | | |
|---|---|---|---|
| 1,856,586 | 5/1932 | Persons. | |
| 1,923,998 | 8/1933 | Payne | 200—122 X |
| 2,487,213 | 11/1949 | Bender | 200—140 X |
| 2,866,339 | 12/1958 | Rhodes et al. | 73—393 X |

BERNARD A. GILHEANY, *Primary Examiner.*

H. M. FLECK, *Assistant Examiner.*